United States Patent
Lee et al.

(10) Patent No.: US 11,561,974 B2
(45) Date of Patent: Jan. 24, 2023

(54) CROSS-DATASOURCE QUERYING USING COMPOSITE SHAPES

(71) Applicant: ADP, Inc., Roseland, NJ (US)

(72) Inventors: John Benlin Lee, New York, NY (US); Kuntal Roy, Basking Ridge, NJ (US); Jason F. Melo, Hastings-on-Hudson, NJ (US)

(73) Assignee: ADP, Inc., Roseland, NJ (US)

( * ) Notice: Subject to any disclaimer, the term of this patent is extended or adjusted under 35 U.S.C. 154(b) by 475 days.

(21) Appl. No.: 16/408,599

(22) Filed: May 10, 2019

(65) Prior Publication Data

US 2020/0356560 A1  Nov. 12, 2020

(51) Int. Cl.
*G06F 16/2453* (2019.01)
*G06F 3/0484* (2022.01)
*G06F 9/451* (2018.01)

(52) U.S. Cl.
CPC ...... *G06F 16/24542* (2019.01); *G06F 3/0484* (2013.01); *G06F 9/451* (2018.02)

(58) Field of Classification Search
CPC ... G06F 16/24542; G06F 9/451; G06F 3/0484
USPC ........................................................ 707/718
See application file for complete search history.

(56) References Cited

U.S. PATENT DOCUMENTS

| | | | |
|---|---|---|---|
| 8,375,014 B1 * | 2/2013 | Brocato | G06F 16/213 707/705 |
| 9,128,995 B1 * | 9/2015 | Fletcher | G06F 16/9535 |
| 2007/0208714 A1 * | 9/2007 | Ture | G06F 16/951 |
| 2012/0134590 A1 * | 5/2012 | Petrou | G06K 9/00483 382/182 |
| 2012/0166472 A1 * | 6/2012 | Hoppenot | G06F 3/0488 707/769 |
| 2017/0019487 A1 * | 1/2017 | Maheshwari | H04L 41/22 |
| 2019/0236203 A1 * | 8/2019 | De Boer | G06F 9/547 |

OTHER PUBLICATIONS

Khairunj, "Query Reuse by Composite Queries," Microsoft Docs, May 17, 2015, accessed Apr. 25, 2019, 3 pages. https://docs.microsoft.com/en-us/dynamicsax-2012/developer/query-reuse-by-composite-queries.
Hau, "Integrate your data with cross-database joins in Tableau 10," Tableau Software, Jul. 19, 2016, Tableau Software, copyright 2003-2019, accessed Apr. 25, 2019, 18 pages. https://www.tableau.com/about/blog/2016/7/integrate-your-data-cross-database-joins-56724.
Seminger et al., "Tutorial: Shape and combine data in Power BI Desktop," Microsoft Docs, Nov. 27, 2018, accessed Apr. 25, 2019, 24 pages. https://docs.microsoft.com/en-us/power-bi/desktop-shape-and-combine-data.

* cited by examiner

*Primary Examiner* — Hosain T Alam
*Assistant Examiner* — Saba Ahmed
(74) *Attorney, Agent, or Firm* — Yee & Associates, P.C.

(57) ABSTRACT

A system and method of performing a cross-datasource query to provide a cross-datasource query result. A composite shape comprises a composite shape query and a plurality of shape identifiers identifying a plurality of shapes. Each of the plurality of shapes comprises a datasource identifier identifying a datasource and a shape query defining a query to be performed on the datasource. The composite shape is used to perform the composite shape query across the datasources identified in the plurality of shapes to provide the cross-datasource query result.

20 Claims, 8 Drawing Sheets

CROSS-DATASOURCE QUERYING USING COMPOSITE SHAPES

BACKGROUND INFORMATION

1. Field

The present disclosure relates generally to systems and methods for querying data from datasources by a computer system. More particularly, the present disclosure is related to a system and method for querying and shaping data from across multiple datasources by a computer system using composite shapes. Illustrative embodiments provide a system and method for creating and using composite shapes to perform cross-datasource queries. A composite shape is defined by a query and identifies a plurality of shapes. Each of the plurality of shapes comprises a query and identifies a different datasource. One or more of the shapes identified by a composite shape may be another composite shape. When a composite shape is executed, the queries identified by the plurality of shapes are performed on the identified datasources to provide intermediate data query results. The query defined by the composite shape is then performed on the intermediate results to obtain a cross-datasource query result.

2. Background

An application is a computer program that is designed to run on a data processing system to perform a group of coordinated functions, tasks, or activities for the benefit of a user. An application also may be referred to as an app, an application program, or a software application.

An application may be developed using a development platform that provides an environment in which programmers or others may create application software through graphical user interfaces and configuration instead of traditional computer programming. Such a development platform may both expedite the application development process and enable end-users and others with limited or no computer programming skill or experience to develop applications. For example, without limitation, such a development platform may be referred to as a rapid application development platform, a low-code development platform, or a no-code development platform.

An organization, such as a business entity or another appropriate organization, may use a variety of applications to perform a variety of different actions. For example, a business organization may use a variety of different applications to perform a variety of different actions related to human capital management. Human capital management also may be referred to as human resource management.

An application may retrieve data from a datasource to perform an action. For example, an application may execute a data query to retrieve desired information from a datasource to perform a particular action. The data query may be implemented by the application using an appropriate data query language. A data query language is a computer language that is used to make queries in databases and other datasources.

The data retrieved from a datasource in response to a data query may be in a particular format based, for example, on the format of the data as stored in the datasource and the data query language used to implement the data query. It may be desirable to process the data retrieved in response to a data query before the data is used by an application to perform an action. For example, it may be desirable to reformat, filter, sort, aggregate, or perform other appropriate processes, or combinations of processes, on the data retrieved in response to a data query. Such processing of the data retrieved in response to a data query may be referred to as data shaping.

Accordingly, it would be beneficial to have a method and apparatus that take into account one or more of the issues discussed above, as well as other possible issues. For example, it would be beneficial to have a method and apparatus for defining data queries and data shaping for applications in a development platform without the need for traditional computer programming. More particularly, it would be beneficial to have a method and apparatus for defining and executing data queries and data shaping for data residing across a plurality of datasources.

SUMMARY

The illustrative embodiments provide a method of performing a cross-datasource query to provide a cross-datasource query result. A composite shape is received. The composite shape comprises a composite shape query and a plurality of shape identifiers identifying a plurality of shapes. Each of the plurality of shapes comprises a datasource identifier identifying a datasource and a shape query defining a query to be performed on the datasource. The composite shape is used to perform the composite shape query across datasources identified in the plurality of shapes to provide the cross-datasource query result.

The illustrative embodiments also provide a method of performing a cross-datasource query to provide a cross-datasource query result including defining a plurality of shapes and a composite shape. Each shape in the plurality of shapes comprises a datasource identifier identifying a datasource and a shape query defining a query to be performed on the datasource. The composite shape comprises a composite shape query and a plurality of shape identifiers. Each shape identifier in the plurality of shape identifiers identifies a different shape in the plurality of shapes. The plurality of shapes and the composite shape are stored in a configuration store. The composite shape is used to perform the composite shape query across datasources identified in the plurality of shapes identified by the plurality of shape identifiers to provide the cross-datasource query result.

The illustrative embodiments also provide an apparatus for performing a cross-datasource query to provide a cross-datasource query result including a configuration store and a run-time platform. The configuration store has stored therein a plurality of shapes and a composite shape. Each shape in the plurality of shapes comprises a datasource identifier identifying a datasource and a shape query defining a query to be performed on the datasource. The composite shape comprises a composite shape query and a plurality of shape identifiers. Each shape identifier in the plurality of shape identifiers identifies a different shape in the plurality of shapes. The run-time platform is configured to use the composite shape in the configuration store to perform the composite shape query across datasources identified in the plurality of shapes in the configuration store that are identified in the plurality of shape identifiers to provide the cross-datasource query result.

Various features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a number of different considerations. "A number," as used herein with reference to items, means one or more items. For example, "a number of different considerations" are one or more different considerations.

The illustrative embodiments recognize and take into account that it may be necessary or desirable for an application to be able to combine data from a plurality of datasources for several reasons. For example, it may be necessary or desirable for an application to combine data from multiple datasources in order to split data into purpose-built datastores. For example, it may be necessary or desirable for an application, such as an application in a computer implemented human capital management system or another application, to combine data from multiple datasources in order to split the data into a graph database for organizational structured data and a relational database for tabular data. As another example, it may be necessary or desirable for an application to combine data from multiple data sources in order to combine data from external sources. For example, it may be necessary or desirable for an application, such as an application in a computer implemented human capital management system or another application, to combine data from multiple data sources in order to show the online presence of an individual in an employee directory.

The illustrative embodiments recognize and take into account that, typically, the retrieval of data from across multiple datastores may require the production of customized program code to implement each cross-datasource query. Composite shapes in accordance with an illustrative embodiment provide a standardized capability for describing the combination and filtration of data from multiple datastores that enables a developer to interact with separate datastores in much the same way that they would interact with data from the internal system of record of the development platform.

In accordance with an illustrative embodiment, composite shapes enable an application developer using a development platform to retrieve, join, and query data from a plurality of separate datasources as if the data came from a single datasource. The plurality of separate datasources may be logically separate, physically separate, or both logically and physically separate.

In accordance with an illustrative embodiment, a composite shapes engine manages data in such a way that the same query generation logic used for the internal system of record for the development platform is used for cross-datasource queries. Therefore, any query capability added to the internal system of record may be rapidly adapted to and implemented for datasources outside of the development platform.

A composite shapes engine in accordance with an illustrative embodiment may perform certain execution optimizations when datasets being combined and queried over are sourced from the same physical or logical datasource. Therefore, application developers are free to combine datasets as necessary without the need to manually specify or optimize how data is retrieved and combined.

Data presented by the composite shapes engine is presented to other components in the development platform in the same way as data sourced from the platform internal system of record. This enables the other components in the development platform to consume datasets that are stitched together from multiple separate datasources in the same way they would consume datasets sourced from the development platform internal system of record.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category. For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 1:
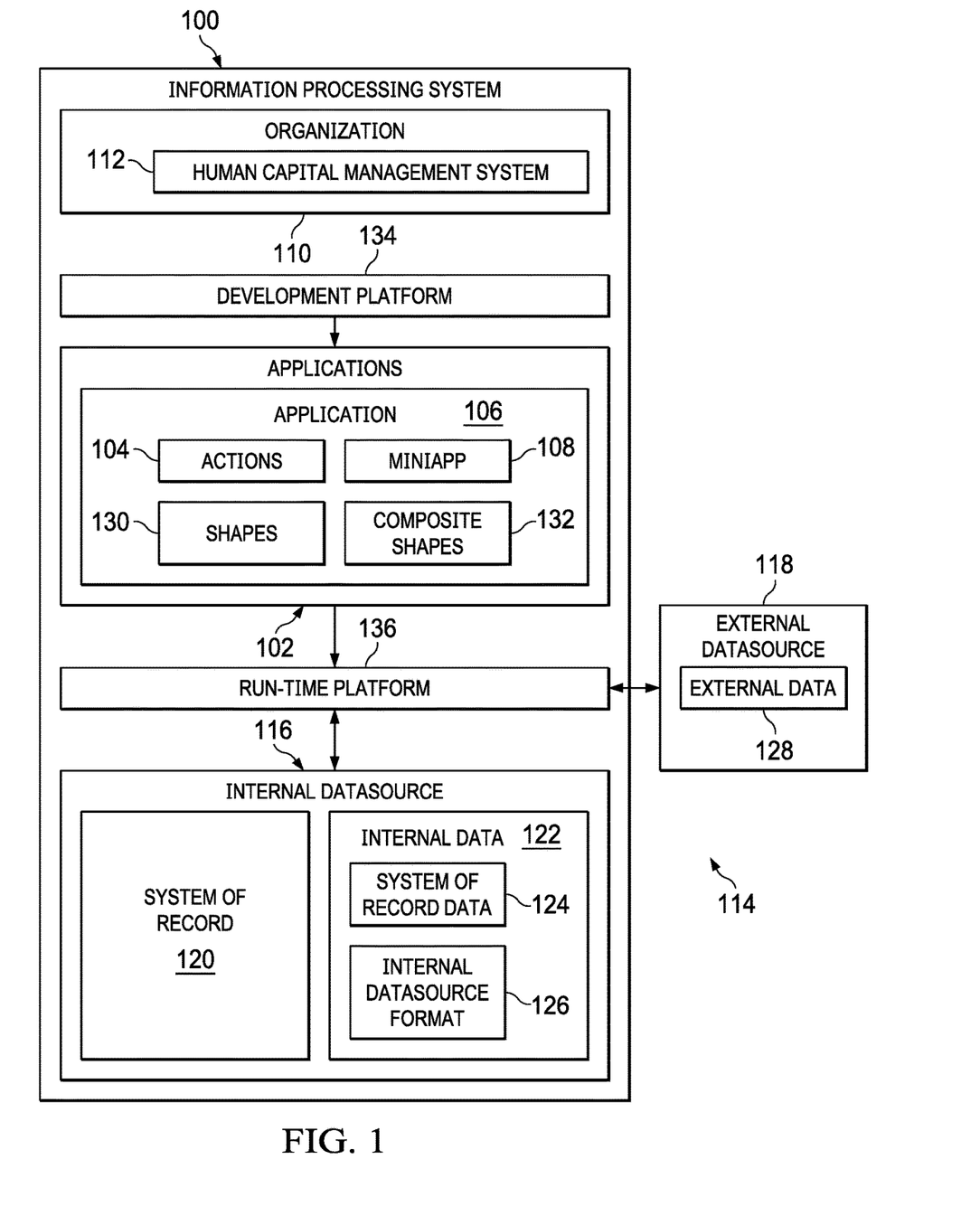
FIG. 1 is an illustration of a block diagram of an information processing system for cross-datasource querying using composite shapes in accordance with an illustrative embodiment.

Turning to FIG. 1, an illustration of a block diagram of an information processing system for cross-datasource querying using composite shapes is depicted in accordance with an illustrative embodiment. Information processing system 100 may be any appropriate system in which applications 102 are developed, run to perform actions 104, or developed and run to perform actions 104. For example, information processing system 100 may comprise one or more computers. Information processing system 100 may comprise a plurality of computers that may be connected in communication with each other by any appropriate local or distributed network. For example, without limitation, information processing system 100 may be implemented using data processing system 900 in FIG. 9.

Information processing system 100 in accordance with an illustrative embodiment may be configured to develop, run, or develop and run any appropriate number of applications 102 to perform any appropriate number of actions 104. Each application 106 in applications 102 may be configured to perform any appropriate number of actions 104. For example, application 106 in applications 102 may be configured to perform one or more actions 104.

Any appropriate number of applications 102 may be implemented as miniapps. For example, application 106 in applications 102 may be implemented as miniapp 108. Miniapp 108 may be a relatively small or simple, discrete, user facing application. For example, miniapp 108 may be configured to provide only one function or a few functions for a user. Miniapp 108 may be built using building blocks, as described, for example, in U.S. Pat. No. 10,019,242, entitled User Interface Engine for Miniapp Development, which is incorporated by reference herein in its entirety. In this example, building blocks are distinct, atomic units of functionality executable by a computer to perform a function. Multiple building blocks may be combined together to form miniapp 108. In some cases, miniapp 108 may be formed by a single building block.

Information processing system 100 may be operated by or for any appropriate organization 110 to perform any appropriate actions 104 for organization 110. For example, without limitation, organization 110 may be a business entity, a government entity, a military organization, a charitable organization, an educational organization, a scientific or research entity, or any other appropriate organization or entity or combination of organizations and entities.

Applications 102 developed, running, or developed and running in information processing system 100 may be configured to perform any actions 104 that are appropriate for organization 110 by or for which information processing system 100 is operated. For example, without limitation, when organization 110 is a business entity or other appropriate organization, applications 102 may be configured to perform actions 104 that are related to managing the human resources of the business entity or other organization. In this case, applications 102 developed, running, or developed and running on information processing system 100 may be configured to implement human capital management system 112 for organization 110.

Applications 102 may be configured to retrieve data from datasources 114 to perform actions 104. Datasources 114 may include any appropriate number of databases or other sources of data for use by applications 102. For example, without limitation, datasources 114 may include internal datasource 116 and external datasource 118. Datasources 114 may include more than one internal datasource 116 and more than one external datasource 118.

Internal datasource 116 may be a source of data that is under the control of organization 110 by or for which information processing system 100 is operated to develop, run, or develop and run applications 102 to perform actions 104 for organization 110. Internal datasource 116 may be part of information processing system 100 or otherwise associated with information processing system 100. Alternatively, part or all of internal datasource 116 may separate from information processing system 100 but accessible by applications 102 running on information processing system 100 using appropriate network or other connections.

For example, without limitation, internal datasource 116 may comprise system of record 120 for organization 110. System of record 120 may comprise any appropriate information storage system that is the authoritative datasource for particular data elements or pieces of information for organization 110. For example, when applications 102 implement human capital management system 112 for organization 110, system of record 120 may comprise the authoritative datasource for information that may be used by organization 110 to manage the human resources of organization 110. System of record 120 also may be referred to as a source system of record.

Data that is stored in internal datasource 116 and may be retrieved from internal datasource 116 by applications 102 may be referred to as internal data 122. For example, without limitation, when internal datasource 116 is system of record 120 for organization 110, internal data 122 may be referred to as system of record data 126.

In any case, internal data 122 may be stored in internal datasource 116 in internal datasource format 126. Internal datasource format 126 may be a format for storing data that is under the control of, or otherwise well known by, organization 110 by or for which information processing system 100 is operated to develop, run, or develop and run applications 102 to perform actions 104 for organization 110.

External datasource 118 may be any source of data that is not under the control of organization 110. Alternatively, or in addition, external datasource 118 may be any source of data that is physically remote from information processing system 100 but accessible by applications 102 running on information processing system 100 using appropriate network or other connection.

Data that is stored in external datasource 118 and may be retrieved from external datasource 118 by applications 102 may be referred to as external data 128. External data 128 may be stored in external datasource 118 in a format for storing data that is not under the control of organization 110 by or for which information processing system 100 is operated to develop, run, or develop and run applications 102 to perform actions 104 for organization 110.

In accordance with an illustrative embodiment, applications 102 may use shapes 130 and composite shapes 132 to retrieve data from datasources 114 to perform actions 104. Shapes 130 define requests for data from a single one of datasources 114. For example, each one of shapes 130 may define a request for data from a single internal datasource 116 or a single external datasources 118. Each one of shapes 130 identifies a one of datasources 114 from which data is to be retrieved, comprises a query that defines the information to be retrieved from the identified datasource, and may include data shaping items that define data shaping that is to be performed on the data that is retrieved from the identified datasource in response to the query.

In accordance with an illustrative embodiment, composite shapes 132 define requests for data from across a plurality of datasources 114. For example, without limitation, composite shapes 132 may define requests for data from across internal datasource 116 and external datasource 118.

In accordance with an illustrative embodiment, each one of composite shapes 132 may identify a plurality of shapes 130. Each of the plurality of shapes 130 identified in one of composite shapes 132 may identify a different one of datasources 114 from which data is to be retrieved. When one of composite shapes 132 is executed, the queries defined by the plurality of shapes 130 identified in the composite shape are performed to provide intermediate data query results from across the plurality of datasources 114 identified by the shapes 130 that are identified by the composite shape. Each of composite shapes 132 comprises a query that defines the information to be retrieved from the intermediate data query results retrieved from across a plurality of datasources 114 to provide cross-datasource query results. Composite shapes 132 also may include data shaping items that define data shaping that is to be performed on the cross-datasource query results that are retrieved from the intermediate data query results.

In accordance with an illustrative embodiment, information processing system 100 may include development platform 134 and run-time platform 136. Alternatively, an illustrative embodiment may include one of development platform 134 or run-time platform 136.

Development platform 134 is a tool for creating applications 102 by an application developer or other operator. Development platform 134 preferably is configured to enable an operator to create applications 102 through the use of graphical user interfaces instead of traditional computer programming. Therefore, development platform 134 enables end-users and others with limited or no computer programming skill or experience to create applications 102. For example, without limitation, development platform 134 may be configured to enable an operator to create applications 102 that retrieve data from datasources 114 to perform actions 104 by identifying shapes 130 and composite shapes 132 that are executed to retrieve data from datasources 114 when applications 102 are run.

In accordance with an illustrative embodiment, development platform 134 may include a shape designer and a composite shape designer. A shape designer in accordance with an illustrative embodiment may be configured to provide user interfaces that enable an operator to create shapes 130 without traditional computer programming. A composite shape designer in accordance with an illustrative embodiment is configured to provide user interfaces that enable an operator to create composite shapes 132 without traditional computer programming.

Run-time platform 136 is configured to run applications 102 to perform actions 104. For example, run-time platform 136 is configured to execute shapes 130 and composite shapes 132 that are identified in applications 102 to retrieve data from datasources 114 for use by applications 102 to perform actions 104.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided or combined and divided into different blocks when implemented in different illustrative embodiments.

For example, composite shapes 132 are specific types of shapes 130. Therefore, one or more of the plurality of shapes 130 identified in composite shapes 132 may be other composite shapes 132.

Figure 2:
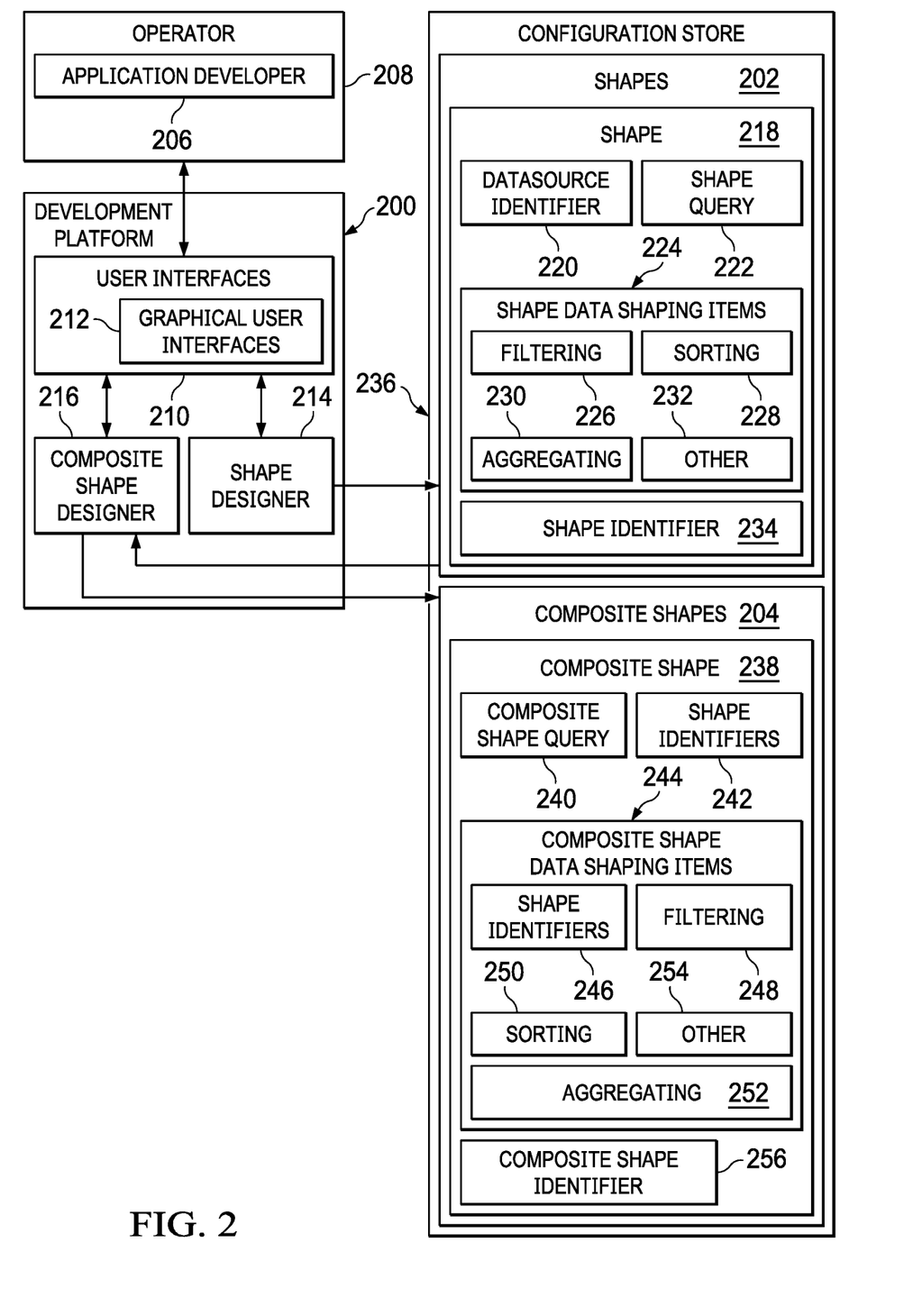
FIG. 2 is an illustration of a block diagram of a development system for creating shapes and composite shapes for cross-datasource querying in accordance with an illustrative embodiment.

Turning to FIG. 2, an illustration of a block diagram of a development system for creating shapes and composite shapes for cross-datasource querying is depicted in accordance with an illustrative embodiment. Development platform 200 is an example of one implementation of development platform 134 in FIG. 1.

Development platform 200 provides a tool for creating shapes 202 and composite shapes 204 by application developer 206 or other operator 208. Development platform 200 is configured to provide various user interfaces 210 that enable operator 208 to create shapes 202 and composite shapes 204. User interfaces 210 may be presented to operator 208 on any appropriate display device or other appropriate user interface device. Operator 208 may interact with user interfaces 210 to create shapes 202 and composite shapes 204 using any appropriate user input device.

Development platform 200 preferably is configured to generate and display graphical user interfaces 212 that enable operator 208 to create shapes 202 and composite shapes 204 without traditional computer programming. Graphical user interfaces 212 are examples of user interfaces 210. Therefore, development platform 200 preferable enables operator 208 with limited or no computer programming skill or experience to create shapes 202 and composite shapes 204.

In accordance with an illustrative embodiment, development platform 200 includes shape designer 214 and composite shape designer 216. Shape designer 214 is configured to provide user interfaces 210 that enable operator 208 to create shapes 202. Composite shape designer 216 is configured to provide user interfaces 210 that enable operator 208 to create composite shapes 204.

Shape 218 is an example of shapes 202 that may be created using shape designer 214. Shape 218 may be defined by datasource identifier 220 and shape query 222. Datasource identifier 220 may include any appropriate information for identifying a datasource upon which shape query 222 will be performed. For example, datasource identifier 220 may identify an internal datasource or an external datasource.

Shape query 222 may be defined in any appropriate manner. For example, without limitation, shape query 222 may be defined using a data query language, such as SQL, or another appropriate data query language.

Shape 218 also may include shape data shaping items 224. Shape data shaping items 224 may define various processes for shaping the data that is retrieved by performing shape query 222 on the datasource identified by datasource identifier 220. For example, without limitation, shape data shaping items 224 may define filtering 226, sorting 228, aggregating 230, or other 232 processes, or various combinations of processes, for shaping the data retrieved by shape query 222.

In accordance with an illustrative embodiment, shape designer 214 may provide graphical user interfaces 212 that enable operator 208 to define datasource identifier 220, shape query 222, and shape data shaping items 224 for shapes 202 without conventional computer programming. For example, without limitation, shape designer 214 may provide graphical user interfaces 212 that prompt operator 208 to define shapes 202 by selecting from pre-defined options for datasource identifier 220, shape query 222, and shape data shaping items 224.

Shapes 202 created using shape designer 214 may be stored in configuration store 236. Configuration store 236 may comprise any appropriate storage device or system that is part of the information processing system on which shape designer 214 and composite shape designer 216 are implemented.

Each shape 218 created using shape designer 214 may include shape identifier 234. Shape identifier 234 may comprise a name or any other appropriate identifying information by which shape 218 stored in configuration store 236 may be identified. Shape identifier 234 allows shape 218 to be identified, for example, by an application or a composite shape. For example, without limitation, shape identifier 234 may be selected or otherwise created by operator 208 as part of the process of creating shape 218. Alternatively, shape identifier 234 may be generated automatically by shape designer 214 or by another appropriate process.

Composite shape 236 is an example of composite shapes 204 that may be created using composite shape designer 216. Composite shape 238 may be defined by a plurality of shape identifiers 242 and composite shape query 240. Shape identifiers 242 identify a plurality of shapes 202 that are stored in configuration store 202. For example, shape identifiers 242 may identify a plurality of shapes 202 that are configured to query data from different datasources. During run-time, when composite shape 238 is executed, the queries identified by the plurality of shapes 202 identified by shape identifiers 242 are performed to provide intermediate data query results.

Composite shape query 240 defines a query that is performed on the intermediate data query results to obtain a cross-datasource query result. Composite shape query 240 may be defined in any appropriate manner. In accordance with an illustrative embodiment, the intermediate data query results may be stored in a format corresponding to an internal datasource. Therefore, composite shape query 240 may be defined in the same way as shape query 222 from a single internal datasource.

Composite shape 238 also may include composite shape data shaping items 244. Composite shape data shaping items 244 may define various processes for shaping the data that is retrieved by performing composite shape query 240 on the intermediate data query results. For example, without limitation, composite shape data shaping items 244 may define filtering 248, sorting 250, aggregating 252, or other 254 processes, or various combinations of processes, for shaping the data retrieved by composite shape query 240.

In accordance with an illustrative embodiment, composite shape data shaping items 244 may include shape identifiers 246. Shape identifiers 246 may identify one or more shapes 202 stored in configuration store 236. In this case, the data shaping performed on the data retrieved from the intermediate data query results may be as defined by shape data shaping items 224 in shapes 202 identified by shape identifiers 246.

In accordance with an illustrative embodiment, composite shape designer 216 may provide graphical user interfaces 212 that enable operator 208 to define shape identifiers 242, composite shape query 240, and composite shape data shaping items 244 for composite shapes 204 without conventional computer programming. For example, without limitation, composite shape designer 216 may provide graphical user interfaces 212 that prompt operator 208 to define composite shapes 204 by selecting shape identifiers 242 for shapes 202 that are already defined and stored in configuration store 236, and by selecting from pre-defined options for composite shape query 240, and composite shape data shaping items 244.

Composite shapes 204 created using composite shape designer 216 may be stored in configuration store 236 along with shapes 202. Each composite shape 238 created using composite shape designer 216 may include composite shape identifier 234. Composite shape identifier 256 may comprise a name or any other appropriate identifying information by which composite shape 238 stored in configuration store 236 may be identified. Composite shape identifier 256 allows composite shape 238 to be identified, for example, by an application. For example, without limitation, composite shape identifier 256 may be selected or otherwise created by operator 208 as part of the process of creating composite shape 238. Alternatively, composite shape identifier 256 may be generated automatically by composite shape designer 216 or by another appropriate process.

Composite shapes 204 are specific examples of shapes 202. One or more shapes 202 identified in composite shape 238 may include other composite shapes 204. For example, without limitation, one or more of shape identifiers 242 or shape identifiers 246 in composite shape 238 may comprise composite shape identifier 256 for another one of composite shapes 204.

The illustration of FIG. 2 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided or combined and divided into different blocks when implemented in different illustrative embodiments.

Figure 3:
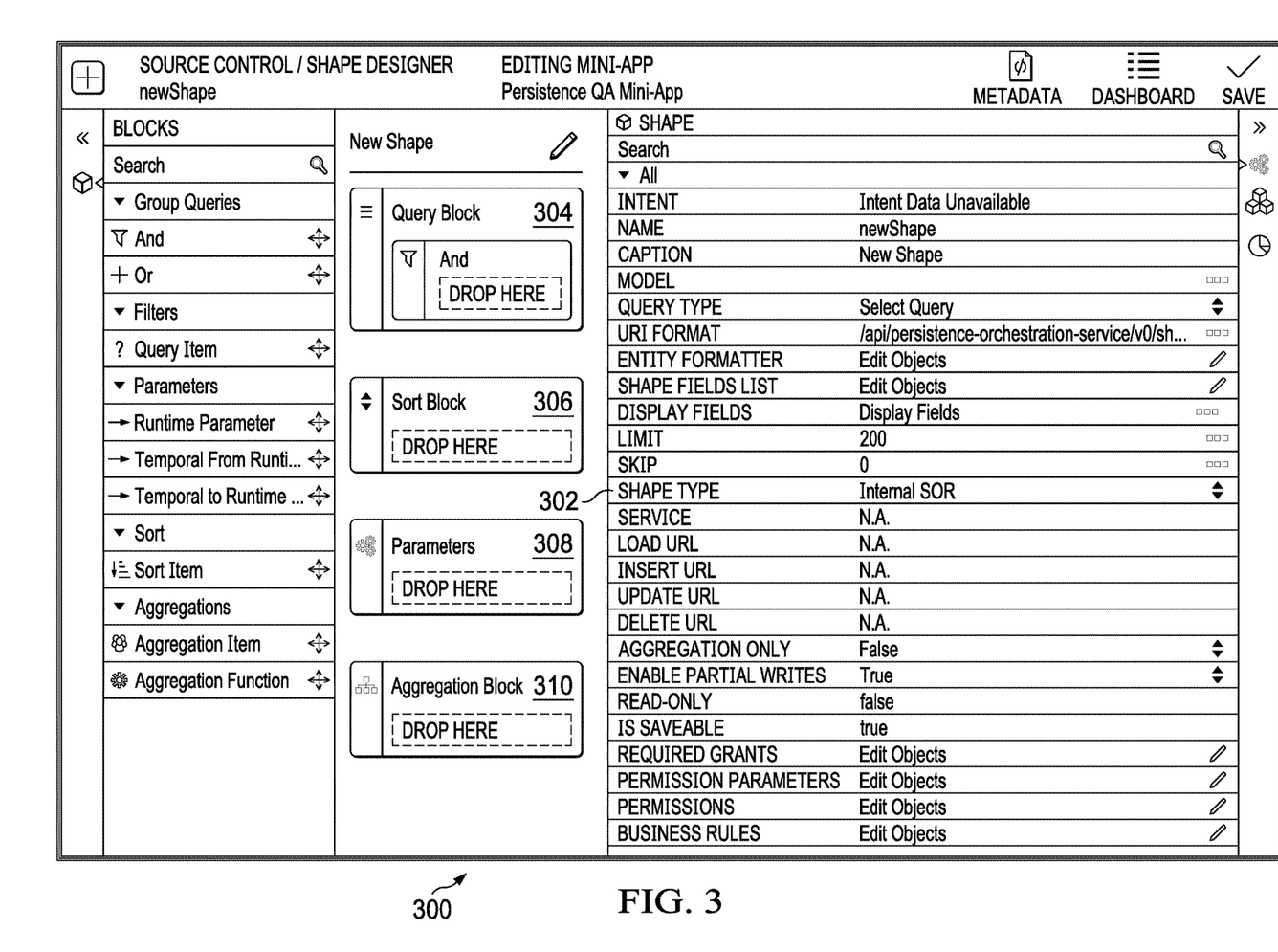
FIG. 3 is an illustration of a user interface for defining a shape in accordance with an illustrative embodiment.

Turning to FIG. 3, an illustration of a user interface for defining a shape is depicted in accordance with an illustrative embodiment. User interface 300 is an example of one implementation of graphical user interfaces 212 that may be provided by shape designer 214 to enable operator 208 to create shapes 202 in FIG. 2.

User interface 300 prompts an operator to identify a datasource for a shape query by selecting a shape type 302. In the example illustrated, an internal system of record datasource is selected. User interface 300 further prompts the operator to define a shape query in query block 304 and to define shape data shaping items in sort block 306, parameters 308, and aggregation block 310.

Figure 4:
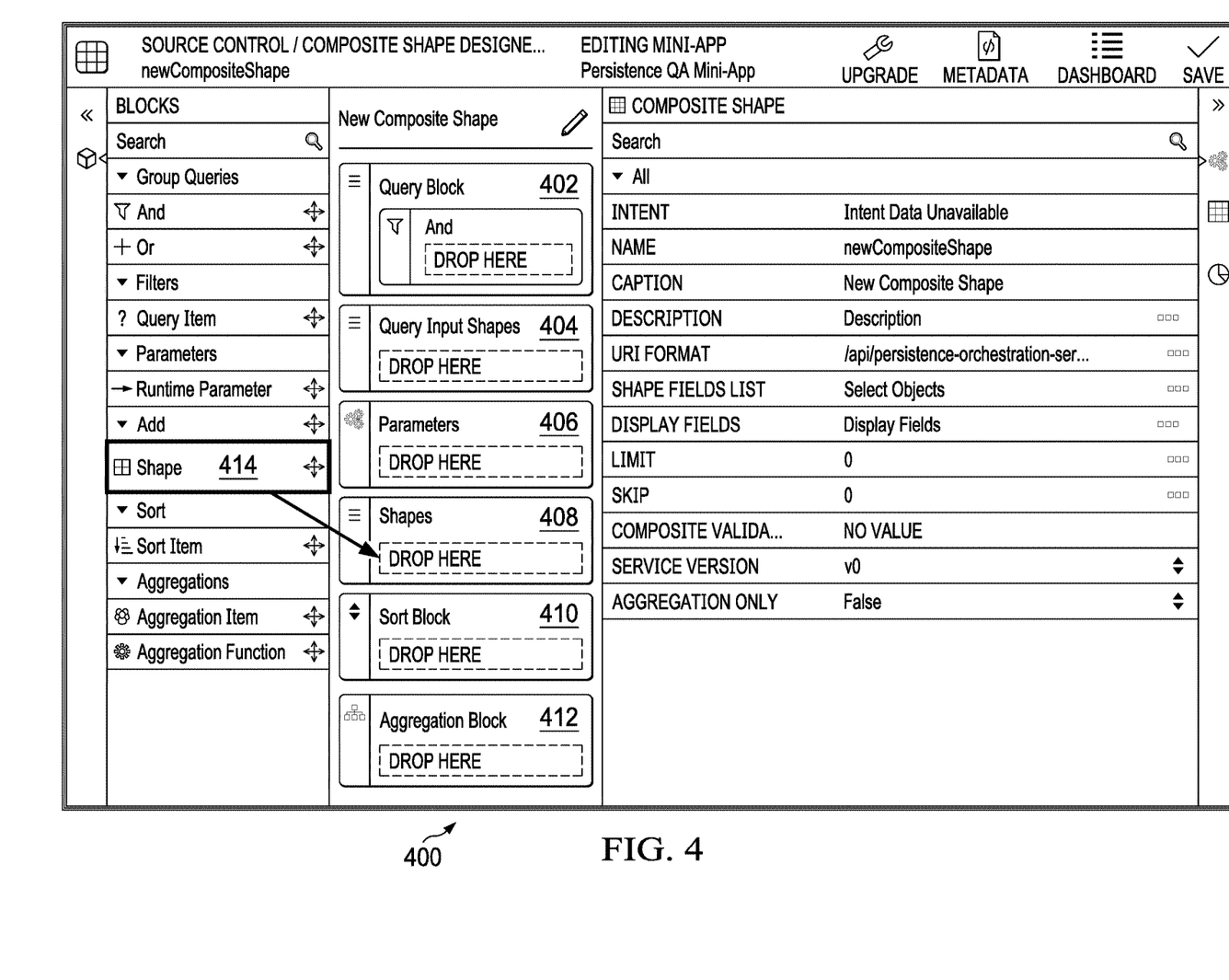
FIG. 4 is an illustration of a user interface for defining a composite shape for cross-datasource querying in accordance with an illustrative embodiment.

Turing to FIG. 4, an illustration of a user interface for defining a composite shape for cross-datasource querying is depicted in accordance with an illustrative embodiment. User interface 400 is an example of one implementation of graphical user interfaces 212 that may be provided by composite shape designer 216 to enable operator 208 to create composite shapes 204 in FIG. 2.

User interface 400 prompts an operator to identify a composite shape query in query block 402. User interface 400 also prompts an operator to select query input shapes 404 that will be run to generate the intermediate data query results on which the composite shape query will be performed.

User interface 400 further prompts the operator to define composite shape data shaping items in parameters 406, shapes 408, sort block 410, and aggregation block 412. For example, shapes 408 may be selected from menu 414 of available shapes.

Figure 5:
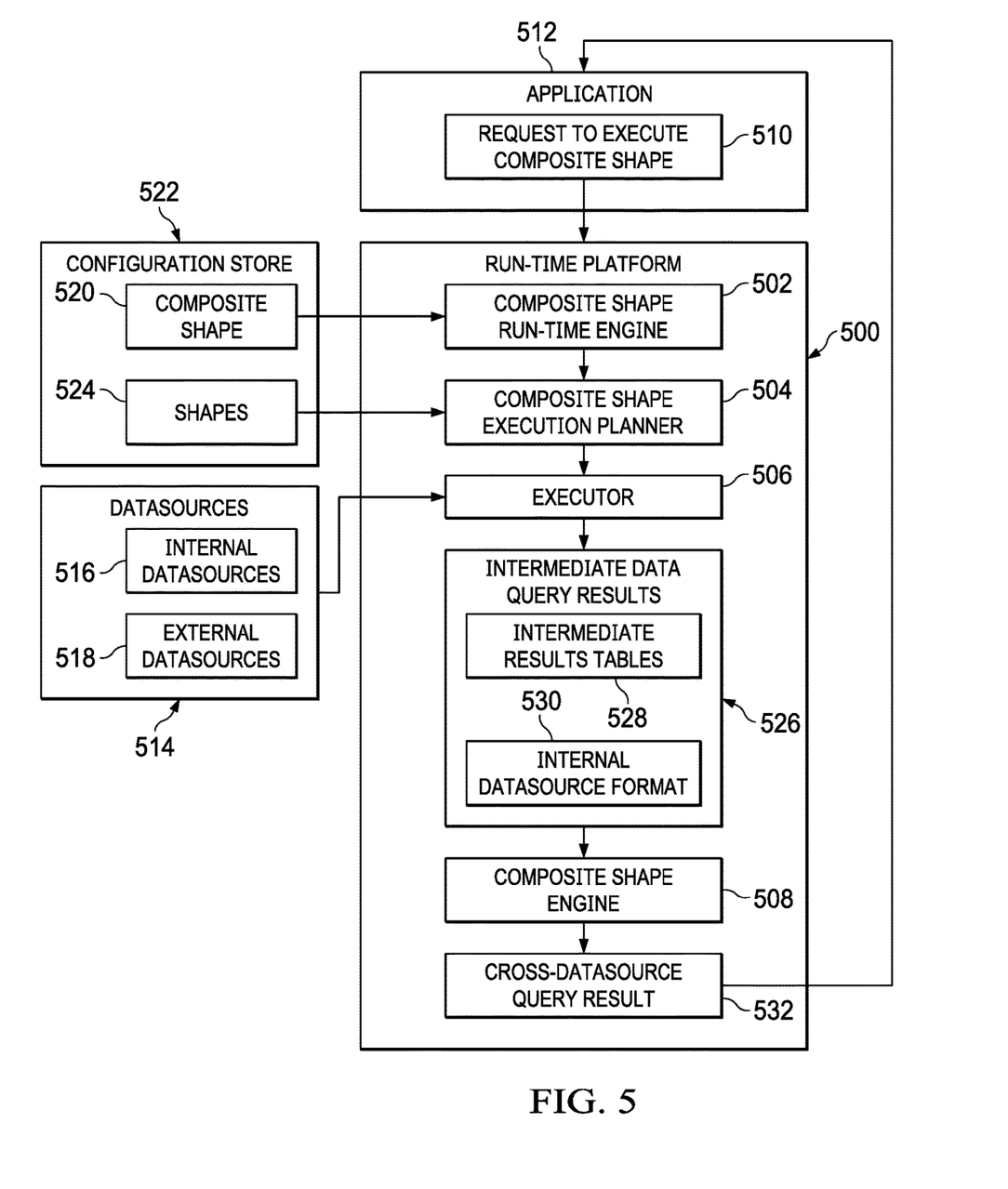
FIG. 5 is an illustration of a block diagram of a run-time platform for executing composite shapes for cross-datasource querying in accordance with an illustrative embodiment.

Turning to FIG. 5, an illustration of a block diagram of a run-time platform for executing composite shapes for cross-datasource querying is depicted in accordance with an illustrative embodiment. Run-time platform 500 is an example of one implementation of run-time platform 136 in FIG. 1. Composite shape run-time platform 500 includes composite shape run-time engine 502, composite shape execution planner 504, executor 506, and composite shape engine 508.

Composite shape run-time engine 502 is configured to execute composite shape 520 to perform a cross-datasource query in response to receiving request to execute composite shape 510. For example, request to execute composite shape 510 may result from running application 512 in which a cross-datasource query is defined using composite shape 520 in accordance with an illustrative embodiment. Composite shape run-time engine 502 may be configured to read composite shape 520 to be executed from configuration store 522.

Composite shape execution planner 504 may be configured to partition composite shape 520 read from configuration store 522 to determine shapes 524 identified in composite shape 520. Composite shape execution planner 504 may then read shapes 524 identified in composite shape 520 from configuration store 522 and determine datasources 514 and queries defined by shapes 524 identified in composite shape 520. Alternatively, or in addition, composite shape execution planner 504 may read other composite shapes from configuration store 522 and process the other composite shapes in a similar manner when one or more of shapes 524 identified by composite shape 520 is another composite shape. Datasources 514 identified by shapes 524 may include both internal datasources 516 and external datasources 516, as described above. Composite shape planner 504 may then plan execution of the queries identified in shapes 524 from the datasources identified in shapes 524.

Executor 506 may be configured to execute the plan provided by composite shape planner 504 to perform the queries identified in shapes 524 from the datasources identified in shapes 524. The result of performing the queries identified in shapes 524 are stored as intermediate data query results 526. Intermediate data query results 526 may be stored in intermediate results tables 528 or in any other appropriate format. For example, without limitation, intermediate data query results 526 may be stored in internal datasource format 530 in which data in internal datasources 516 may be stored.

Composite shape engine 508 is configured to perform the composite shape query identified in composite shape 520 on intermediate data query results 526 to provide cross-datasource query result 532. Composite shape engine 508 may perform any data shaping defined by composite shape data shaping items identified in composite shape 520 to cross-datasource query result 532. Cross-datasource query result 532 then may be returned to application 512 in response to request to execute composite shape 510.

The illustration of FIG. 5 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided or combined and divided into different blocks when implemented in different illustrative embodiments.

Figure 6:
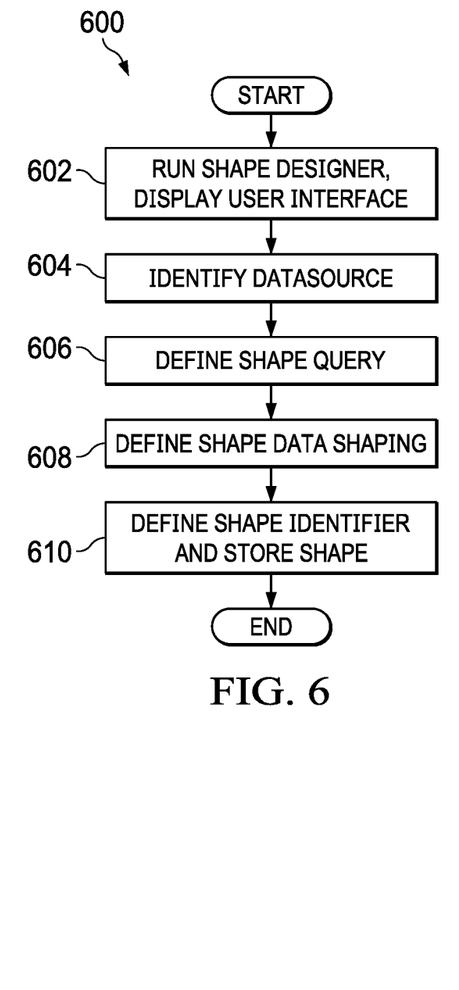
FIG. 6 is an illustration of a flowchart of a process for creating a shape in accordance with an illustrative embodiment.

Turning to FIG. 6, an illustration of a flowchart of a process for creating a shape is depicted in accordance with an illustrative embodiment. For example, without limitation, process 600 may be implemented using shape designer 214 in development platform 200 in FIG. 2.

Process 600 may begin with running a shape designer that displays a user interface (operation 602). The user interface displayed in operation 602 may prompt an operator to define various elements of a shape. The operator then may use the displayed user interface to identify a datasource (operation 604), define a query (operation 606), and define data shaping (operation 608) by defining various shape data shaping items. A shape identifier then may be defined for the shape and the shape stored in a configuration store (operation 610), with the process terminating thereafter.

Figure 7:
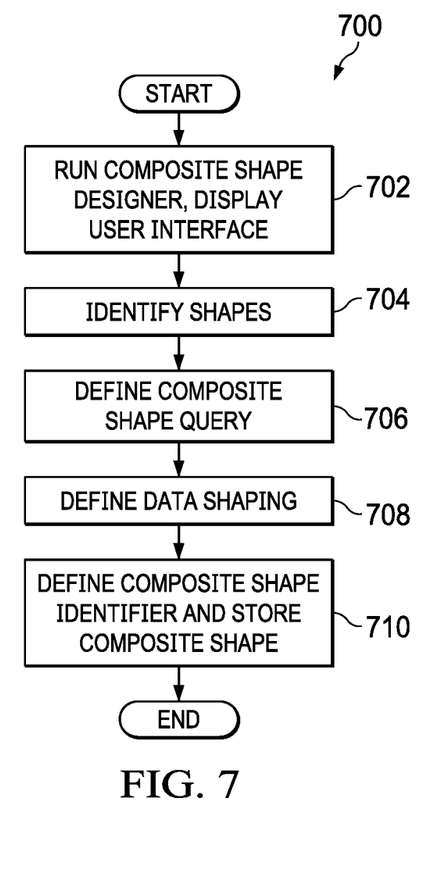
FIG. 7 is an illustration of a flowchart of a process for creating a composite shape for cross-datasource querying in accordance with an illustrative embodiment.

Turning to FIG. 7, an illustration of a flowchart of a process for creating a composite shape for cross-datasource querying is depicted in accordance with an illustrative embodiment. For example, without limitation, process 700 may be implemented using composite shape designer 216 in development platform 200 in FIG. 2.

Process 700 may begin with running a composite shape designer that displays a user interface (operation 702). The user interface displayed in operation 702 may prompt an operator to define various elements of a composite shape. The operator then may use the displayed user interface to identify shapes (operation 704), define a query (operation 706), and define data shaping (operation 708) by defining various composite shape data shaping items. A composite shape identifier then may be defined for the composite shape and the composite shape stored in a configuration store (operation 710), with the process terminating thereafter.

Figure 8:
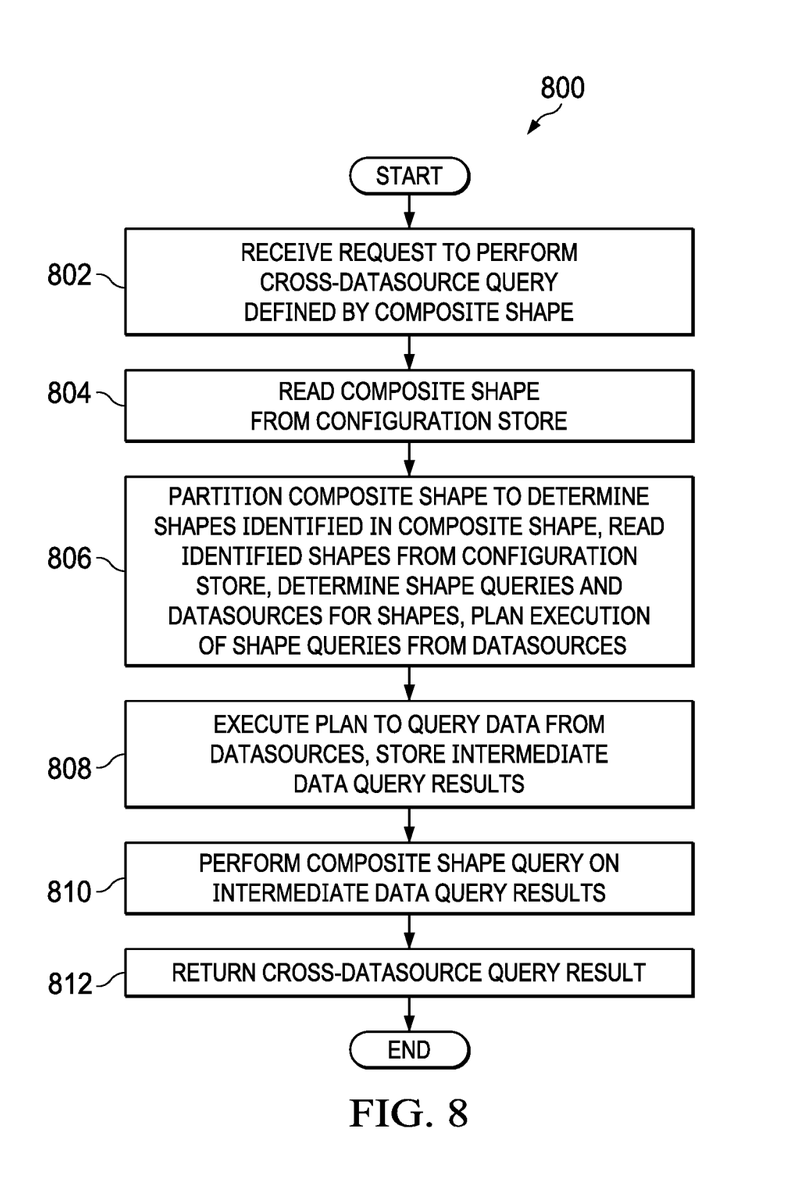
FIG. 8 is an illustration of a flowchart of a process for cross-datasource querying using a composite shape in accordance with an illustrative embodiment.

Turning to FIG. 8, an illustration of a flowchart of a process for cross-datasource querying using a composite shape is depicted in accordance with an illustrative embodiment. Process 800 may be implemented, for example, in run-time platform 500 in FIG. 5.

Process 800 may begin with receiving a request to perform a cross-datasource query defined by a composite shape (operation 802). For example, operation 802 may comprise receiving a request to execute a composite shape from an application. The composite shape identified in operation 802 may be read from a configuration store (operation 804). The composite shape read from the configuration store then may be partitioned to determine the shapes identified in the composite shape, the identified shapes may be read from the configuration store, the queries and datasources identified in the shapes read from the configuration store may be determined, and a plan to perform the identified queries on the identified datasources may be made (operation 806). The plan determined in operation 806 may be executed to query data from the datasources identified in the shapes and the resulting intermediate data query results may be stored (operation 808). The composite shape query identified in the composite shape then may be performed on the intermediate data query results (operation 810). The resulting cross-datasource query result then may be returned in response to the request to perform the cross-datasource query (operation 812), with the process terminating thereafter.

Figure 9:
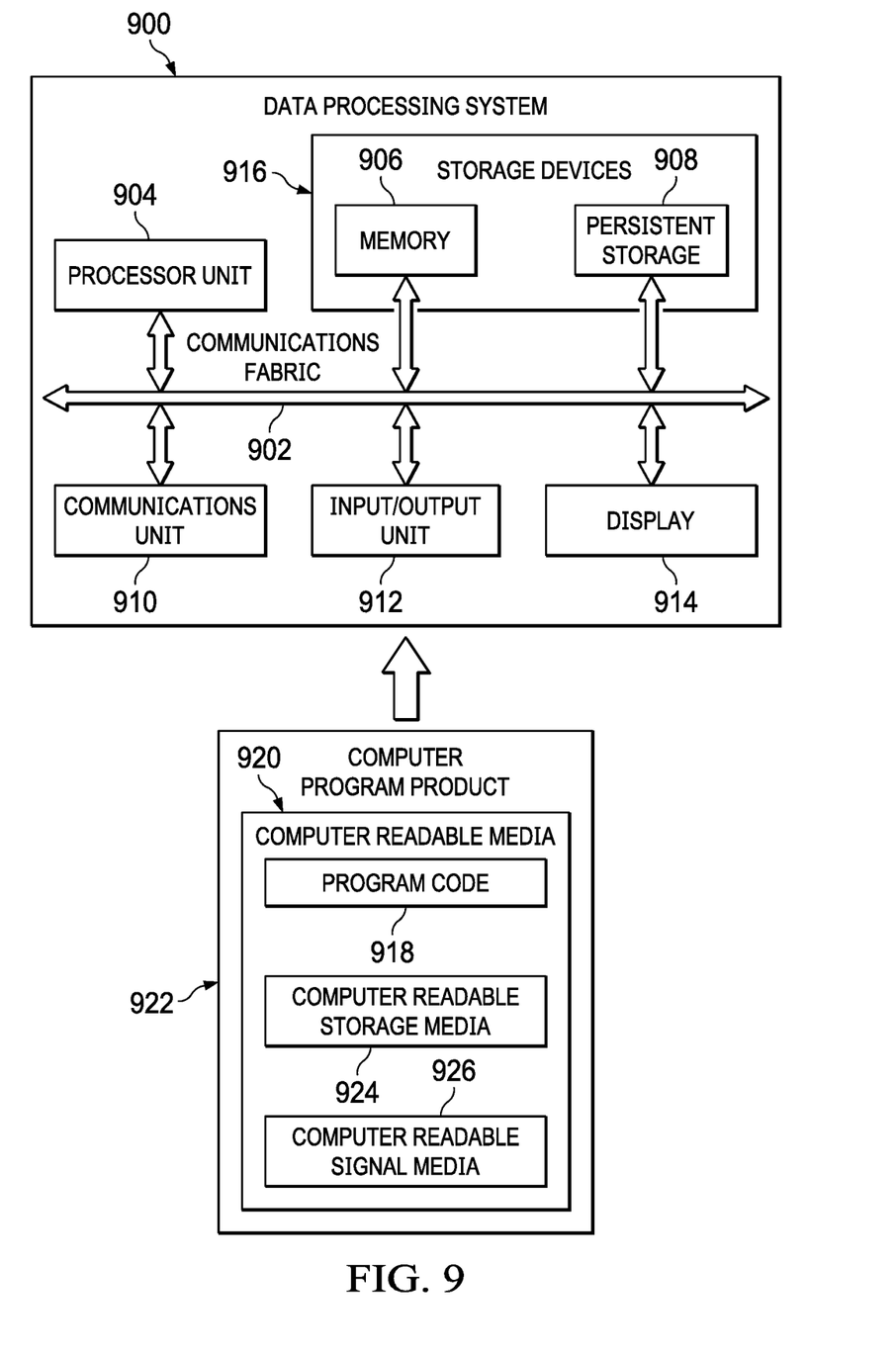
FIG. 9 is an illustration of a block diagram of a data processing system in accordance with an illustrative embodiment.

Turning to FIG. 9, an illustration of a block diagram of a data processing system is depicted in accordance with an illustrative embodiment. Data processing system 900 is an example of a data processing system that may be used to implement the illustrative embodiments. For example, data processing system 900 may be used to implement one or more of information processing system 100 in FIG. 1, development platform 200 in FIG. 2, and run-time platform 500 in FIG. 5. In this illustrative example, data processing system 900 includes communications fabric 902, which provides communications between processor unit 904, memory 906, persistent storage 908, communications unit 910, input/output (I/O) unit 912, and display 914.

Processor unit 904 serves to execute instructions for software that may be loaded into memory 906. This software may be an associative memory, content addressable memory, or software for implementing the processes described elsewhere herein. For example, software loaded into memory 906 may be software for executing one or more of process 600 of FIG. 6, process 700 of FIG. 7, and process 800 of FIG. 8. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output (I/O) unit 912 allows for input and output of data with other devices that may be connected to data processing system 900. For example, input/output (I/O) unit 912 may provide a connection for user input through a keyboard, a mouse, and/or some other suitable input device. Further, input/output (I/O) unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 may be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

As another example, a storage device in data processing system 900 is any hardware apparatus that may store data. Memory 906, persistent storage 908, and computer readable media 920 are examples of storage devices in a tangible form.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 906, or a cache, such as found in an interface and memory controller hub that may be present in communications fabric 902.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium may be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of performing a cross-datasource query to provide a cross-datasource query result, comprising:
    receiving, by a run-time platform of an information processing system, a composite shape, wherein the composite shape comprises a composite shape query and a plurality of shape identifiers identifying a plurality of shapes, wherein each of the plurality of shapes comprises a datasource identifier identifying a datasource and a shape query defining a query to be performed on the datasource; and
    using, by the run-time platform of the information processing system, the composite shape to perform the composite shape query across a plurality of datasources identified in the plurality of shapes to provide the cross-datasource query result,
    wherein:
    a first one of the shape identifiers in the plurality of shape identifiers identifies a first shape in the plurality of shapes that comprises a first datasource identifier that identifies a first datasource that is an internal datasource for an organization for which the cross-datasource query is performed;
    a second one of the shape identifiers in the plurality of shape identifiers identifies a second shape in the plurality of shapes that comprises a second datasource identifier that identifies a second datasource that is an external datasource for the organization for which the cross-datasource query is performed; and
    the composite shape query is in a format for performing a query on the internal datasource.

2. The method of claim 1,
    wherein the internal datasource is under control of the organization, and
    wherein the external datasource is not under control of the organization.

3. The method of claim 1, wherein a shape identifier in the plurality of shape identifiers is a composite shape identifier identifying another composite shape.

4. The method of claim 1, wherein receiving the composite shape comprises reading the composite shape from a configuration store in response to a request by an application to execute the composite shape.

5. The method of claim 4, wherein the application is an application for performing an action in a human capital management system.

6. The method of claim 4, wherein using the composite shape to provide the cross-datasource query result comprises:
- determining the plurality of shapes identified in the composite shape that is read from the configuration store;
- reading the plurality of shapes identified in the composite shape from the configuration store; and
- determining the shape queries and the plurality of datasources identified in the plurality of shapes read from the configuration store.

7. The method of claim 1, wherein using the composite shape to provide the cross-datasource query result comprises:
- performing shape queries for the plurality of shapes identified by the shape identifiers in the composite shape to provide intermediate results, wherein performing the shape queries comprises performing the shape query for each shape identified by the shape identifiers in the composite shape on the datasource identified by the datasource identifier for the shape; and
- performing the composite shape query on the intermediate results to provide the cross-datasource query result.

8. The method of claim 7, wherein the composite shape further comprises composite shape data shaping items and further comprising applying the composite shape data shaping items to shape data resulting from performing the composite shape query on the intermediate results to provide the cross-datasource query result.

9. A method of performing a cross-datasource query to provide a cross-datasource query result, comprising:
- defining a plurality of shapes, using a shape designer of a development platform, wherein each shape in the plurality of shapes comprises a datasource identifier identifying a datasource and a shape query defining a query to be performed on the datasource;
- storing the plurality of shapes in a configuration store of an information processing system;
- defining a composite shape, using a composite shape designer of the development platform, wherein the composite shape comprises a composite shape query and a plurality of shape identifiers, wherein each shape identifier in the plurality of shape identifiers identifies a different shape in the plurality of shapes;
- storing the composite shape in the configuration store of the information processing system; and
- using, by a run-time platform of the information processing system, the composite shape to perform the composite shape query across a plurality of datasources identified in the plurality of shapes identified by the plurality of shape identifiers to provide the cross-datasource query result, wherein:
- a first one of the shape identifiers in the plurality of shape identifiers identifies a first shape in the plurality of shapes that comprises a first datasource identifier that identifies a first datasource that is an internal datasource for an organization for which the cross-datasource query is performed;
- a second one of the shape identifiers in the plurality of shape identifiers identifies a second shape in the plurality of shapes that comprises a second datasource identifier that identifies a second datasource that is an external datasource for the organization for which the cross-datasource query is performed; and
- the composite shape query is in a format for performing a query on the internal datasource.

10. The method of claim 9, wherein:
- defining each shape in the plurality of shapes comprises:
  - displaying a user interface for a shape designer that prompts an operator to identify the datasource for the shape, the shape query for the shape, and shape data shaping items for shaping data resulting from performing the shape query for the shape on the datasource for the shape, and
  - receiving input from the operator by the user interface for the shape designer to define each shape in the plurality of shapes; and
- defining the composite shape comprises:
  - displaying a user interface for a composite shape designer that prompts the operator to identify the composite shape query, shapes in the plurality of shapes, and composite shape data shaping items for shaping data resulting from performing the composite shape query, and
  - receiving input from the operator by the user interface for the composite shape designer to define the composite shape.

11. The method of claim 9,
wherein the internal datasource is under control of the organization, and
wherein the external datasource is not under control of the organization.

12. The method of claim 9, wherein using the composite shape to provide the cross-datasource query result comprises:
- reading the composite shape from the configuration store in response to a request by an application to execute the composite shape;
- determining the plurality of shapes identified in the composite shape that is read from the configuration store;
- reading the plurality of shapes identified in the composite shape from the configuration store;
- determining the shape queries and the plurality of datasources identified in the plurality of shapes read from the configuration store;
- performing the shape queries for the plurality of shapes read from the configuration store to provide intermediate results, wherein performing the shape queries comprises performing the shape query identified in each shape read from the configuration store on the datasource identified by the datasource identifier for the shape; and
- performing the composite shape query on the intermediate results to provide the cross-datasource query results.

13. The method of claim 12, wherein the application is an application for performing an action in a human capital management system.

14. An apparatus for performing a cross-datasource query to provide a cross-datasource query result, comprising:
- a configuration store, of an information processing system, having stored therein a plurality of shapes and a composite shape, wherein each shape in the plurality of shapes comprises a datasource identifier identifying a datasource and a shape query defining a query to be performed on the datasource, wherein the composite shape comprises a composite shape query and a plurality of shape identifiers, wherein each shape identifier in the plurality of shape identifiers identifies a different shape in the plurality of shapes; and a run-time platform, of the information processing system, configured to use the composite shape in the configuration store to perform the composite shape query across a plurality of datasources identified in the plurality of shapes in the configuration store that are identified in the plurality of shape identifiers to provide the cross-datasource query result, wherein:

a first one of the shape identifiers in the plurality of shape identifiers identifies a first shape in the plurality of shapes that comprises a first datasource identifier that identifies a first datasource that is an internal datasource for an organization for which the cross-datasource query is performed;

a second one of the shape identifiers in the plurality of shape identifiers identifies a second shape in the plurality of shapes that comprises a second datasource identifier that identifies a second datasource that is an external datasource for the organization for which the cross-datasource query is performed; and the composite shape query is in a format for performing a query on the internal datasource.

15. The apparatus of claim 14, wherein the internal datasource is under control of the organization, and wherein the external datasource is not under control of the organization.

16. The apparatus of claim 14, wherein a shape identifier in the plurality of shape identifiers is a composite shape identifier identifying another composite shape.

17. The apparatus of claim 14, wherein the run-time platform comprises:

a composite shape run-time engine configured to read the composite shape from the configuration store in response to a request to execute the composite shape by an application;

a composite shape execution planner configured to determine the plurality of shapes identified in the composite shape read from the configuration store, read from the configuration store the plurality of shapes identified in the composite shape read from the configuration store, and determine the shape queries and the plurality of datasources identified in the plurality of shapes read from the configuration store;

an executor configured to perform shape queries for the plurality of shapes read from the configuration store to provide intermediate results, wherein performing the shape queries comprises performing the shape query identified in each shape read from the configuration store on the datasource identified by the datasource identifier for the shape; and a composite shape engine configured to perform the composite shape query on the intermediate results to provide the cross-datasource query results.

18. The apparatus of claim 17, wherein the application is an application for performing an action in a human capital management system.

19. The apparatus of claim 17, wherein the composite shape further comprises composite shape data shaping items and wherein the composite shape engine is further configured to apply the composite shape data shaping items to shape data resulting from performing the composite shape query on the intermediate results to provide the cross-datasource query results.

20. The apparatus of claim 14 further comprising a development platform comprising:

a shape designer configured to, for each shape in the plurality of shapes:

display a user interface that prompts an operator to identify the datasource for the shape, the shape query for the shape, and shape data shaping items for shaping data resulting from performing the shape query for the shape on the datasource for the shape, receive input from the operator by the user interface to define the shape, and store the shape in the configuration store; and a composite shape designer configured to:

display a user interface that prompts the operator to identify the composite shape query, shapes in the plurality of shapes, and composite shape data shaping items for shaping data resulting from performing the composite shape query, receive input from the operator by the user interface to define the composite shape, and store the composite shape in the configuration store.

* * * * *